United States Patent [19]

Matsubara et al.

[11] Patent Number: 5,102,708
[45] Date of Patent: Apr. 7, 1992

[54] DATA RECORDING MEDIUM AND METHOD OF MANUFACTURING THE SAME

[75] Inventors: Motonari Matsubara, Yokohama; Hideki Ohkawa, Tokyo, both of Japan

[73] Assignee: Kabushiki Kaisha Toshiba, Kawasaki, Japan

[21] Appl. No.: 544,971

[22] Filed: Jun. 28, 1990

[30] Foreign Application Priority Data

| Jun. 30, 1989 | [JP] | Japan | 1-169636 |
| Jun. 30, 1989 | [JP] | Japan | 1-169637 |
| Jun. 30, 1989 | [JP] | Japan | 1-169638 |
| Jun. 30, 1989 | [JP] | Japan | 1-169639 |
| Jun. 30, 1989 | [JP] | Japan | 1-169640 |
| Jun. 30, 1989 | [JP] | Japan | 1-169641 |

[51] Int. Cl.$^5$ .............................. B32B 3/00
[52] U.S. Cl. ............................ 428/64; 428/76; 428/457; 428/913; 346/76 L; 346/135.1; 369/288; 430/945
[58] Field of Search ............ 428/64, 65, 76, 913; 346/76 L, 135.1; 369/288; 430/945

[56] References Cited

U.S. PATENT DOCUMENTS

| 3,720,784 | 3/1973 | Maydan et al. | 178/6.6 R |
| 4,373,004 | 2/1983 | Asano et al. | 428/328 |
| 4,433,340 | 2/1984 | Mashita et al. | 346/135.1 |
| 4,906,556 | 3/1990 | Nishikawa et al. | 430/945 |

FOREIGN PATENT DOCUMENTS

| 0285112 | 10/1988 | European Pat. Off. | 428/64 |
| 1123590 | 6/1986 | Japan | 428/64 |
| 63-155443 | 6/1988 | Japan | |

OTHER PUBLICATIONS

N. J. Mazzeo et al., "Fabrication and Testing of Trilayers with a High Deposition Rate Plasma-Polymerized Spacer", Thin Solid Films, 108 (1983), pp. 365-371.

J. I. Gittleman et al., "High Performance Al:Polymer:Al Trilayer Optical Disc II", RCA Review, 47, 67 (1986).

Primary Examiner—Patrick J. Ryan
Assistant Examiner—Elizabeth Evans
Attorney, Agent, or Firm—Foley & Lardner

[57] ABSTRACT

A data recording medium includes a substrate, an undercoat layer formed on the substrate by plasma polymerization using a source gas containing fluorocarbon, and a recording layer formed on the undercoat layer and containing a metal selected from the group consisting of Ag, Au, and Cu, Te, C, and H, data being recorded in the recording layer by forming pits therein. A method of manufacturing a data recording medium includes forming an undercoat layer on a substrate by plasma polymerization using a source gas containing fluorocarbon, and forming a recording layer containing a metal selected from the group consisting of Ag, Au, and Cu, Te, C, and H by reactive sputtering in an atmosphere of a gas mixture of an Ar gas and a hydrocarbon gas.

9 Claims, 8 Drawing Sheets

DATA RECORDING MEDIUM AND METHOD OF MANUFACTURING THE SAME

BACKGROUND OF THE INVENTION

1. Field of the Invention

The present invention relates to a data recording medium and a method of manufacturing the same and, more particularly, to a data recording medium of a pit formation type having an undercoat layer formed under a recording layer and a method of manufacturing the same.

2. Description of the Related Art

As a conventional data recording medium of a type in which data is recorded by forming pits, a data recording medium having a Bi thin film on a substrate was disclosed in D. Maydan, Bell Syst. Tech. J., 50,1761 (1971); U.S. Pat. No. 3,720,784. In 1977, a data recording medium having a recording layer formed of Te alloy, which has been put into practical use, was disclosed by R. McFarlane et al. in Philips, "Proceedings of SPIE", 123, 104 (1977). Te alone is easily oxidized in a high-temperature atmosphere. Production of $TeO_2$ degrades the recording sensitivity of a data recording medium because $TeO_2$ absorbs no light in a near-infrared wavelength. In addition, if peripheral portions of pit formation regions are oxidized upon formation of pits, and $TeO_2$ is produced in these portions, reflectivities of the peripheral portions of the pit formation regions are decreased. As a result, the pit formation regions become obscure, and undesired effects appear in reproduction of recorded data. For this reason, in order to prevent degradation in recording sensitivity, it is desired that the recording layer of a pit formation type recording medium is composed of a material having oxidation resistance.

Under the circumstances, a data recording medium which the oxidation resistance of a recording layer is improved by using a Te-Se alloy thin film as the recording layer is disclosed in M. Terao et al., J. Appl. Phys., 50,6881 (1979). However, since cracks are easily formed in a Te-Se alloy thin film, Pb is added to form a Pb-Te-Se alloy thin film in practice. In this manner, Te alloys are used as materials for recording layers.

In addition, a method of forming a recording layer, called a Te-C layer, having excellent oxidation resistance by sputtering a Te target in an atmosphere containing a $CH_4$ gas is disclosed in M. Mashita and N. Yasuda, "Proceedings of SPIE", 329, 190 (1982); U.S. Pat. No. 4,433,340. Furthermore, a method of obtaining a $CS_2$-Te thin film having excellent oxidation resistance by depositing Te while performing plasma polymerization using a $CS_2$ gas is disclosed in Y. Asano et al.,; U.S. Pat. No. 4,373,004; J.J.A.P., 22, 480 (1983); Published Examined Japanese Patent Application No. 58-17038.

Recording medium having these recording layers have poor recording sensitivities because satisfactory reflection of laser beams does not occur in data recording. Published Unexamined Japanese Patent Application No. 59-90246 discloses a data recording medium whose recording sensitivity is improved by forming a fluorocarbon undercoat layer under the recording layer. In addition, Published Unexamined Japanese Patent Application No. 62-154343 discloses a method of further improving recording sensitivity by specifying the ratio of fluorine to carbon in an undercoat layer.

With an increase in data transfer speed and data recording capacity, the rotational speed of a disk is increased. The recording sensitivities of these data recording medium are not good enough for such data recording. A strong demand, therefore, has arisen for a data recording medium having higher recording sensitivity.

SUMMARY OF THE INVENTION

It is the first object of the present invention to provide a data recording medium which has an excellent recording sensitivity, enables stable data read without being influenced by noise, and allows recording/reproducing operations with light beams having various energy powers.

It is the second object of the present invention to provide a method of easily manufacturing such a data recording medium.

In order to achieve the first object, according to the present invention, there is provided a data recording medium, comprising a substrate, an undercoat layer formed on the substrate by plasma polymerization using a source gas containing fluorocarbon, and a recording layer formed on the undercoat layer and containing Te, C and a metal selected from the group consisting of Ag, Au, and data being recorded in the recording layer by forming pits therein.

In order to achieve the second object, according to the present invention, there is provided a method of manufacturing a data recording medium, comprising the steps of forming an undercoat layer on a substrate by plasma polymerization using a source gas containing fluorocarbon, and forming a recording layer containing Te, C and a metal selected from the group consisting of Ag, Au, and by reactive sputtering in an atmosphere of a gas mixture of an Ar gas and a hydrocarbon gas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described in detail below with reference to the accompanying drawings.

Figure 1:
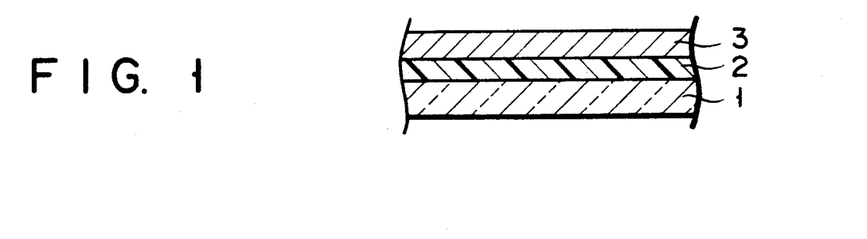
FIG. 1 is a sectional view of a data recording medium of the present invention.

FIG. 1 is a sectional view of a data recording medium of the present invention. The data recording medium comprises a substrate 1, an undercoat layer 2 formed on the substrate 1 by plasma polymerization, and a recording layer 3 formed on the undercoat layer 2 by reactive sputtering.

The substrate 1 is composed of a material exhibiting a relatively small change in quality with time, e.g., a polycarbonate resin or glass. In addition, the substrate 1 is preferably made of a transparent material so as to allow recording of data by irradiating light beam on either side of the data recording medium.

The undercoat layer 2 is obtained by plasma polymerization using a fluorocarbon gas as a source gas. As a fluorocarbon gas, $CF_4$, $C_2F_6$, $C_4F_8$, or the like may be used. If a gas used for reactive ion etching, e.g., $CF_4$ or $C_2F_6$ is to be used, a hydrogen gas must be mixed with such a fluorocarbon gas in order to moderate an etching effect. In contract to this, a $C_4F_8$ gas can be used alone as a plasma polymerization gas, and hence is preferable. Of $C_4F_8$ gases, a gas containing cyclic $C_4F_8$ is especially preferable because a uniform polymer film can be obtained.

Figure 2:
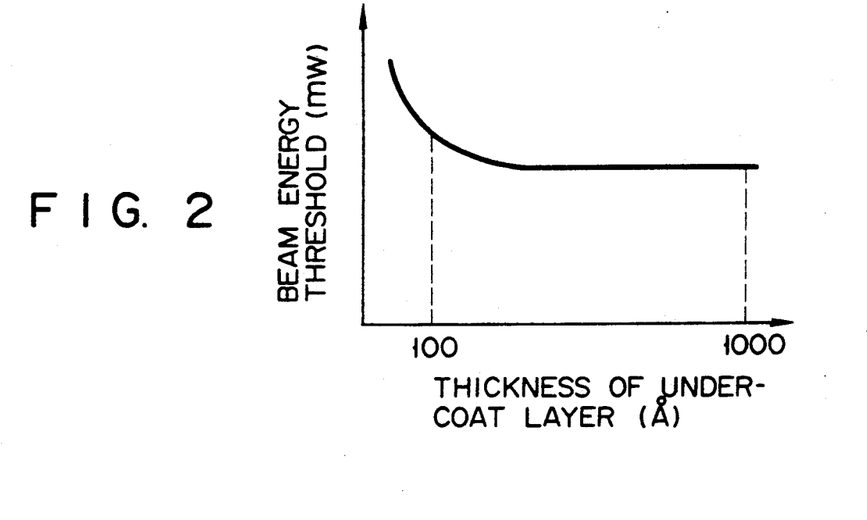
FIG. 2 is a graph showing a relationship between the energy threshold of a recording light beam and the thickness of an undercoat layer.
Figure 3:
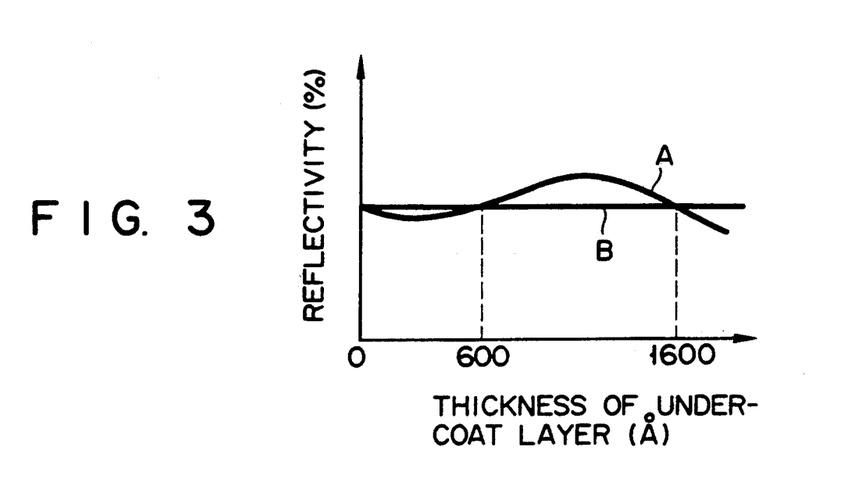
FIG. 3 is a graph showing a relationship between the thickness of an undercoat layer and the reflectivity of a data recording medium.

The thickness of the undercoat layer preferably falls within the range of 100 to 1,000 Å in consideration of the energy threshold of a light beam. As shown in FIG. 2, if the thickness of the undercoat layer 2 is less than 100 Å, the recording sensitivity is degraded and the beam energy threshold required for formation of data recording pits is increased. If the thickness of the undercoat layer 2 exceeds 1,000 Å, the film formation efficiency of a plasma polymer film is decreased. In consideration of the reflectivity of a data recording medium, however, the thickness of the undercoat layer 2 preferably falls within the range of 600 to 1,600 Å. FIG. 3 shows a relationship between the thickness of an undercoat layer and the reflectivity of a data recording medium. Referring to FIG. 3, reference symbol A denotes a characteristic curve obtained when the reflectivity of the recording medium is calculated by using a refractive index and an extinction coefficient in consideration of the thickness of each layer. Reference symbol B denotes a characteristic curve obtained when the reflectivity of a conventional data recording medium having no undercoat layer is calculated in a similar manner. The thickness of the undercoat layer is set in the range of 600 to 1,600 Å for the following reason. As shown in FIG. 3, when the thickness of the undercoat layer falls within this range, the reflectivity of the data recording medium is increased due to the multiple interference effect of light irradiated on the data recording medium. With an increase in reflectivity of the data recording medium, reproduction light which is not influenced by noise can be efficiently generated when data read is performed.

The thickness of the undercoat layer, therefore, preferably falls within the range of 600 to 1,000 Å.

The recording layer 3 is preferably composed of a metal which is easily melted at a relatively low temperature. The following materials may be used as such a metal: Te, Se, Bi, Sb, In, Ag, Au, Cu, Sn, Pb, or an alloy consisting of two or more thereof. In this case, the recording layer 3 is formed by depositing an alloy of Te and a metal selected from the group consisting of Ag, Au, and Cu by reactive sputtering in the presence of a gas mixture of an Ar gas and a hydrocarbon gas. When these alloys are to be used for the recording layer 3, they preferably have amorphous structures.

Figure 4:
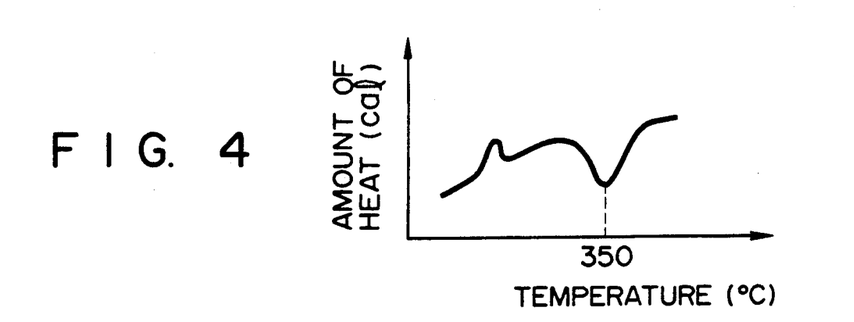
FIG. 4 is a graph showing the DSC curve of an Ag-Te alloy used for the recording layer of a data recording medium according to the present invention.
Figure 5:
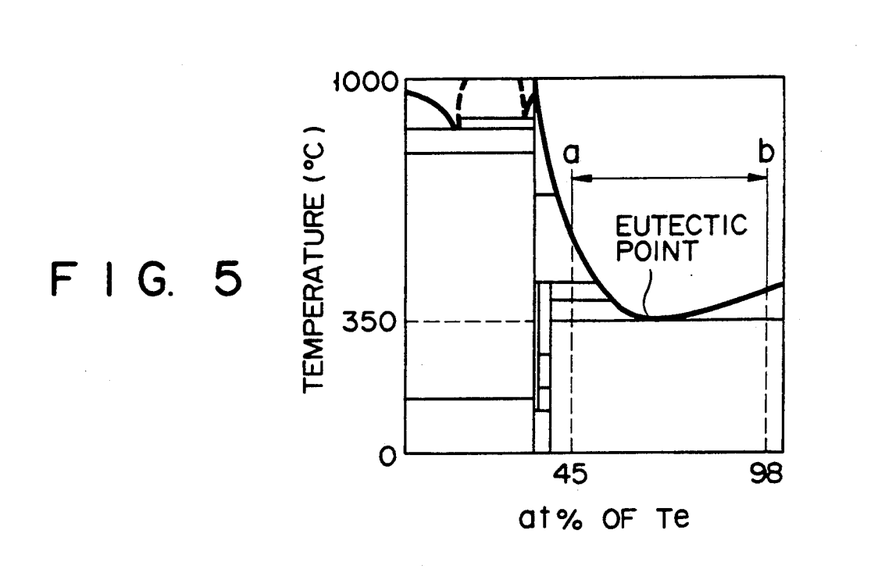
FIG. 5 is a phase diagram of the Ag-Te alloy.

If Ag is selected, the composition ratio x of Ag to Te in an Ag-Te alloy preferably satisfies $2 \leq x \leq 55$ at. % in $Ag_xTe_{100-x}$. This is because, if the composition ratio of Ag is less than 2 at. %, the recording layer obtained by reactive sputtering tends to be oxidized at high temperatures. If it exceeds 55 at. %, the melting point of the alloy is increased, and the recording sensitivity is degraded. FIG. 4 shows a characteristic curve obtained by differential scanning calorimetery (DSC) of an alloy of Te and Ag having a composition ratio which falls within the range defined in the present invention. As shown in FIG. 4, this alloy has an endothermic peak near 350° C., and begins to melt near this temperature. FIG. 5 is phase diagram of Ag and Te. As is apparent from FIG. 5, an Ag-Te alloy has a eutectic temperature and the minimum melting point (about 350° C.) near a composition of $Ag_{33}Te_{67}$. Therefore, an alloy having a composition ratio which falls within this range ($45 \leq Te$ at. $\% \leq 98$, between points a and b in FIG. 5) is suitable for a recording layer having a high recording sensitivity.

Figure 6:
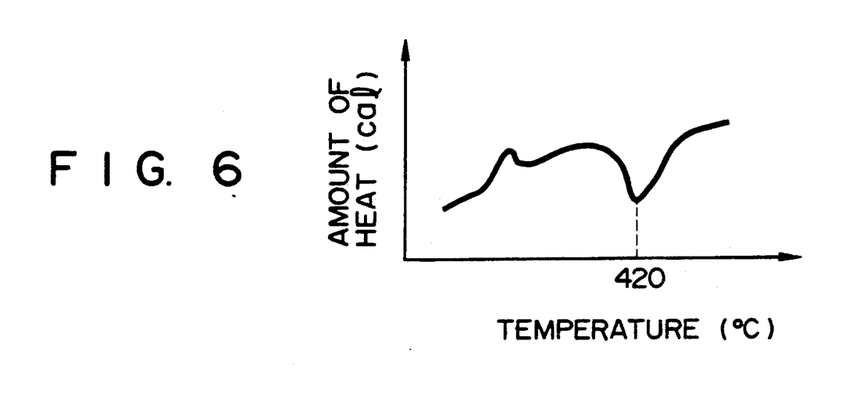
FIG. 6 is a graph showing the DSC curve of an Au-Te alloy used for the recording layer of a data recording medium according to the present invention.
Figure 7:
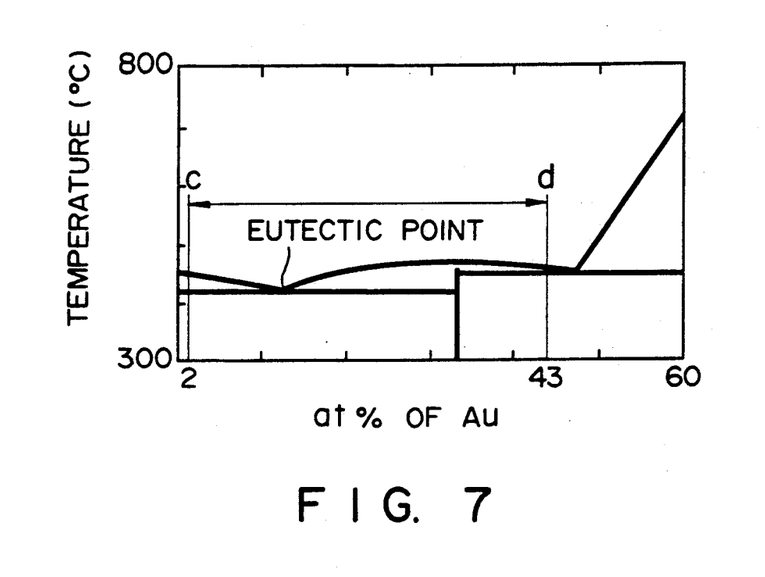
FIG. 7 is a phase diagram of the Au-Te alloy.

If Au is selected, the composition ratio y of Au to Te in an Au-Te alloy preferably satisfies $2 \leq y \leq 43$ at. % in $Au_yTe_{100-y}$ for the following reason. Similar to the case of Ag, if the composition ratio of Au is less than 2 at. %, the recording layer obtained by reactive sputtering is susceptible to oxidation at high temperatures. In contrast to this, if it exceeds 43 at. %, the melting point of the alloy is increased, and the recording sensitivity is degraded. FIG. 6 shows a characteristic curve obtained by DSC of an alloy of Te and Au having a composition ratio which falls within the range defined in the present invention. As shown in FIG. 6, this alloy has an endothermic peak near 420° C., and beings to melt near this temperature. FIG. 7 is phase diagram of Au and Te. As is apparent from FIG. 7, an Au-Te alloy has a eutectic temperature and the minimum melting point (about 420° C.) near a composition of $Au_{12}Te_{88}$. Therefore, an alloy having a composition ratio which falls within this range ($57 \leq Te$ at. $\% \leq 98$, between points c and d in FIG. 7) is suitable for a recording layer having a high recording sensitivity.

Figure 8:
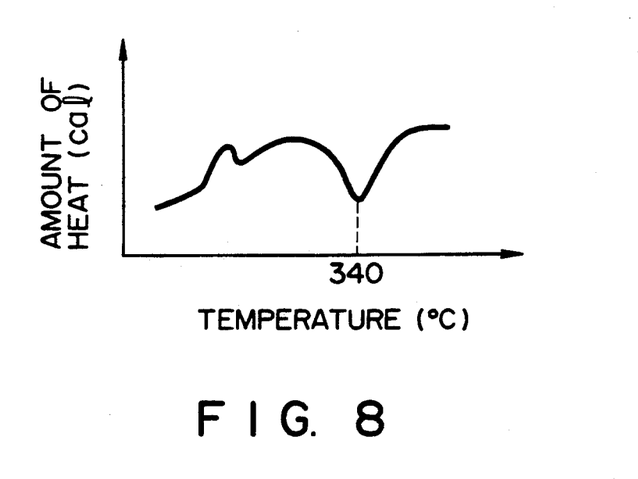
FIG. 8 is a graph showing the DSC curve of a Cu-Te alloy used for the recording layer of a data recording medium according to the present invention.
Figure 9:
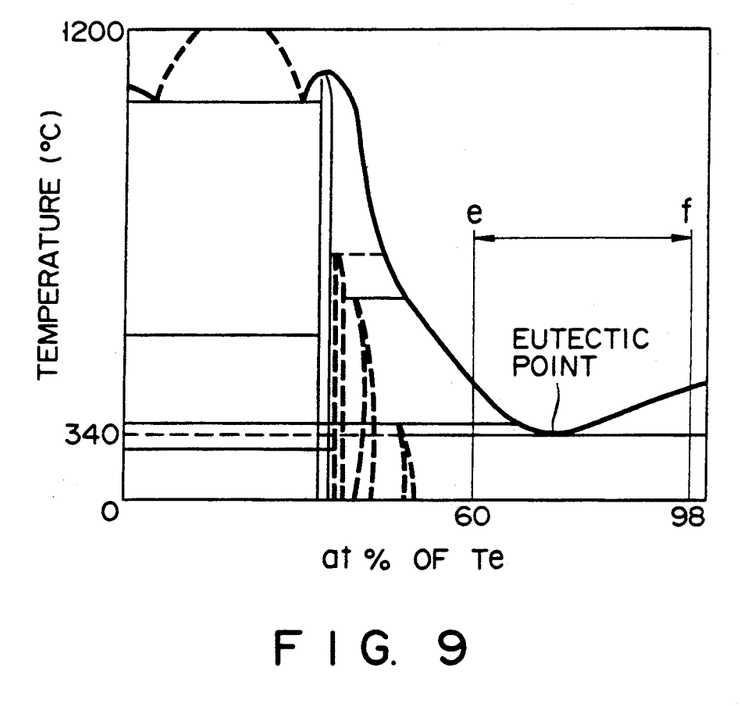
FIG. 9 is a phase diagram of the Cu-Te alloy.

If Cu is selected, the composition ratio z of Cu to Te in a Cu-Te alloy preferably satisfies $2 \leq z \leq 40$ at. % in $Cu_2Te_{100-z}$ for the following reason. Similar to the cases of Ag and Au, if the composition ratio of Cu is less than 2 at. %, the recording layer obtained by reactive sputtering is susceptible to oxidation at high temperatures. In contrast to this, if it exceeds 40 at. %, the melting point of the alloy is increased, and the recording sensitivity is degraded. FIG. 8 shows a characteristic curve obtained by DSC of an alloy of Te and Cu having a composition ratio defined in the present invention. As shown in FIG. 8, this alloy has an endothermic peak near 340° C., and begins to melt near this temperature. FIG. 9 is phase diagram of Cu and Te. As is apparent from FIG. 9, a Cu-Te alloy has a eutectic temperature and the minimum melting point (about 340° C.) near a composition of $Cu_{30}Te_{70}$. Therefore, an alloy having a composition ratio which falls within this range ($60 \leq Te$ at. $\% \leq 98$) is suitable for a recording layer having a high recording sensitivity.

Of the above-described metals, Ag and Au are especially preferable because the energy threshold of recording light beam powers, at which the carrier-to-noise ratio of a recorded/reproduced signal reaches 40 dB, are relatively small.

Figure 10:
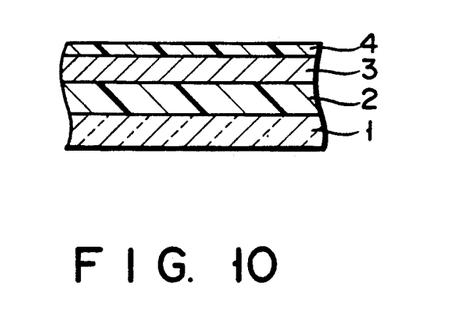
FIG. 10 is a sectional view of a data recording medium having an overcoat layer according to the present invention.
Figure 11:
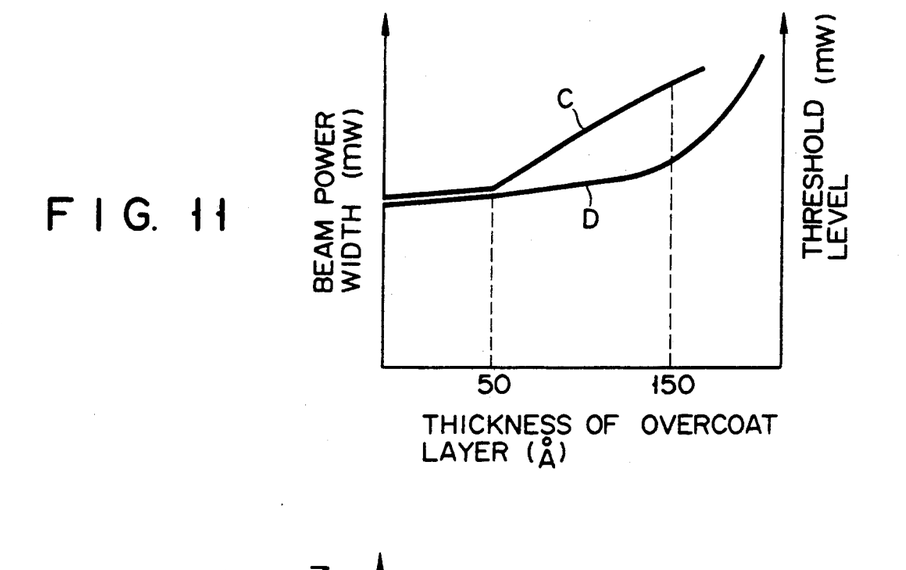
FIG. 11 is a graph showing a relationship between the thickness of an overcoat layer, and the width of a recording light beam power with which a carrier-to-noise ratio of a recorded/reproduced signal of 45 dB or more is obtained and the energy threshold level of a recording light beam at which pit formation is properly performed at C/N=40 dB.

In order to stabilize the recording sensitivity of the recording layer 3, an overcoat layer 4 may be formed on the recording layer 3, as shown in FIG. 10. In this case, the overcoat layer 4 is composed of a material for stabilizing the recording sensitivity of the recording layer 3 and protecting the layer 3. As such an overcoat layer, a plasma polymer film obtained by plasma polymerization using a fluorocarbon gas as a source gas may be used. The thickness of the overcoat layer 4 preferably falls within the range of 50 to 150 Å in order to improve the recording sensitivity of the recording layer. FIG. 11 shows a relationship between the thickness of an overcoat layer, and the width of a recording light beam power which can be used and the energy threshold of a recording light beam. Referring to FIG. 11, reference symbol C denotes a characteristic curve representing a relationship between the thickness of an overcoat layer and the width of a recording light beam power which can be used; and D, a characteristic curve representing a relationship between the thickness of an overcoat layer and the energy threshold of a recording light beam. As is apparent from FIG. 11, a data recording medium having an overcoat layer whose thickness falls within the range of 50 to 150 Å allows a certain width of a recording power which can be used in a state wherein the recording sensitivity is not degraded, i.e., a state wherein the energy threshold of recording light beam is not increased.

In order to record data in such a data recording medium, a light beam is irradiated on the recording layer 3. At this time, a irradiated portion of the recording layer 3 is increased in energy, and heat is generated in the portion. As a result, the irradiated portion is melted or evaporates to form a pit therein.

Reproduction of recorded data is performed in such a manner that a light beam having a lower power than that of a light beam used for recording is irradiated on the recording layer 3, and an optical characteristics difference, e.g., a difference in reflectivity between a pit portion and a portion where no pit is formed, is detected.

A method of manufacturing the data recording medium of the present invention will be described below The undercoat layer 2 is formed on the substrate 1 by plasma polymerization using a fluorocarbon gas such as $C_4F_8$. The recording layer 3 is then formed on the undercoat layer 2 by reactive sputtering by using a target composed of an alloy of Te and a metal selected from the group consisting of Ag, Au, and Cu, in the presence of a gas mixture of an Ar gas and a hydrocarbon gas. Note that plasma polymerization and reactive sputtering are performed by conventional methods. More specifically, plasma polymerization is performed in a plasma polymerizing apparatus comprising a vacuum chamber, a gas feed port for feeding a gas into the chamber, and an RF power source for generating a plasma. In this apparatus, a substrate is placed in the vacuum chamber, a fluorocarbon gas is fed into the chamber, and the gas is converted into a plasma in the chamber by a high frequency, thus performing plasma polymerization. Reactive sputtering is performed in a sputtering apparatus comprising a vacuum chamber, a gas feed port for feeding a gas into the chamber, and a power source for applying an electric power to a target located in the chamber. In this apparatus, sputtering is performed by placing a substrate at a position opposite to a target in the chamber, feeding a gas mixture of an Ar gas and a hydrocarbon gas into the chamber at a predetermined flow rate, and applying an electric power to the target.

The undercoat layer 2 is preferably formed under the following conditions: the pressure of a fluorocarbon gas: 0.01 to 0.1 Torr; the flow rate of the fluorocarbon gas: 20 to 400 cc/min per 1 m$^3$; and an electrode current density: 0.5 to 2.0 mA/cm$^2$.

Figure 12:
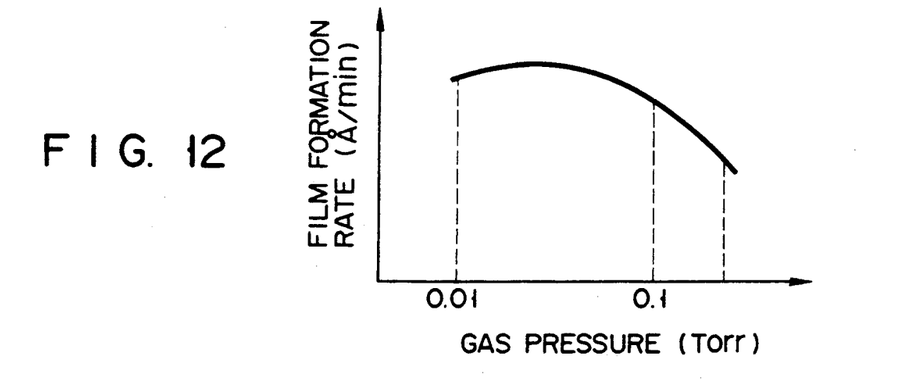
FIG. 12 is a graph showing a relationship between the film formation rate of an undercoat layer and the pressure of a fluorocarbon gas.

FIG. 12 shows a relationship between the film formation rate of an undercoat layer and the pressure of a fluorocarbon gas. As shown in FIG. 12, the maximum film formation rate appears near a fluorocarbon gas pressure of 0.03 Torr. When the gas pressure is less than 0.01 Torr, no discharge occurs and hence plasma polymerization cannot be performed. If it exceeds 0.1 Torr, an ablation effect becomes remarkable, and the film formation rate is decreased. As a result, an obtained undercoat layer has a rough surface.

Figure 13:
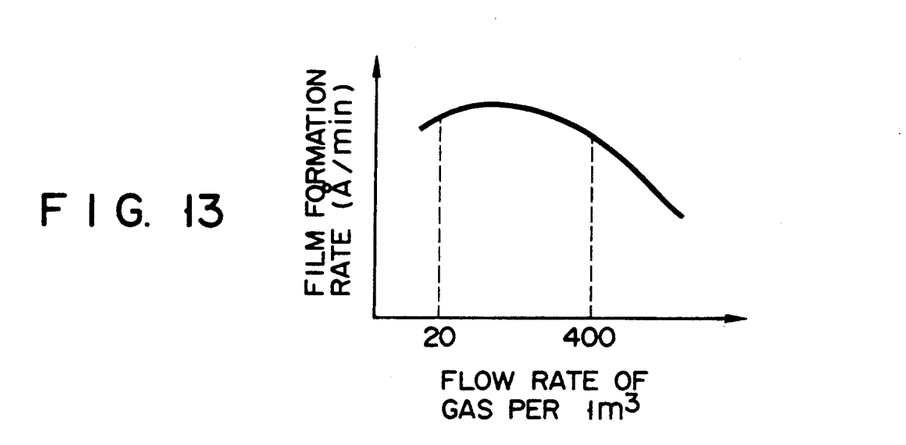
FIG. 13 is a graph showing a relationship between the film formation rate of an undercoat layer and the flow rate of a fluorocarbon gas.

FIG. 13 shows a relationship between the film formation rate of an undercoat layer and the flow rate of a fluorocarbon gas. As shown in FIG. 13, the film formation rate is large when the flow rate of the fluorocarbon gas falls within the range of 20 to 400 cc/min per 1 m$^3$. If the flow rate of the fluorocarbon gas is less than 20 cc/min per 1 m$^3$, an excessive amount of the plasma polymer stays in the reaction vessel, and the film formation rate is decreased. If it exceeds 400 cc/min per 1 m$^3$, an ablation effect becomes conspicuous, and the film formation rate is decreased. As a result, an obtained undercoat layer has a rough surface.

Figure 14:
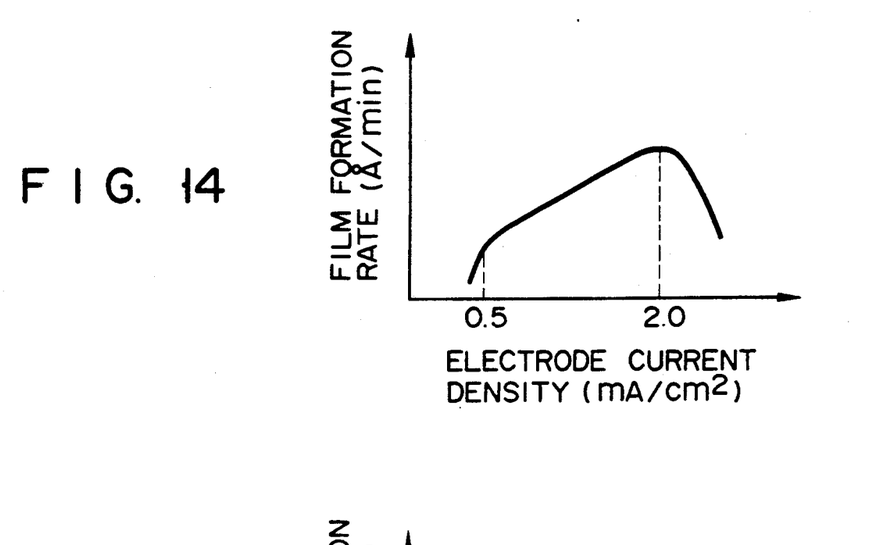
FIG. 14 is a graph showing a relationship between the film formation rate of an undercoat layer and an electrode current density.

FIG. 14 shows a relationship between the film formation rate of an undercoat layer and an electrode current density. As shown in FIG. 14, the electrode current density is proportional to the film formation rate within the range of 0.5 to 2.0 mA/cm$^2$. If the electrode current density is less than 0.5 mA/cm$^2$, no discharge occurs and hence plasma polymerization cannot be performed. If it exceeds 2.0 mA/cm$^2$, the decomposition reaction of a plasma polymer becomes more remarkable than the production reaction of a plasma polymer, and the film formation rate is decreased.

The recording layer 3 is formed on the undercoat layer 2 by reactive sputtering. The recording layer 3 is preferably formed by setting the ratio of the flow rate of a hydrocarbon gas to the total flow rate of a gas mixture of an Ar gas and the hydrocarbon gas to be 5 to 50%. In addition, sputtering can be properly performed by setting the pressure of the gas mixture to be 0.1 Torr or less. Note that as a hydrocarbon gas, CH$_4$ may be used.

Figure 15:
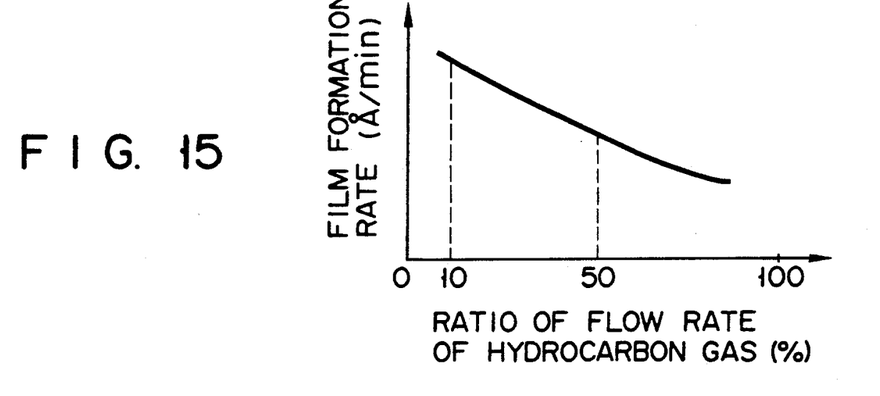
FIG. 15 is a graph showing a relationship between the film formation rate of a recording layer and the flow rate ratio of a hydrocarbon gas in the flow rate of a gas mixture.

FIG. 15 shows a relationship between the film formation rate of the recording layer 3 and the ratio of the flow rate of the hydrocarbon gas to the total flow rate of the gas mixture. As shown in FIG. 15, the film formation rate of the recording layer is increased with a decrease in ratio of the flow rate of the hydrocarbon gas to that of the gas mixture. If the ratio of the flow rate of the hydrocarbon gas to that of the gas mixture is less than 5%, an obtained recording layer is susceptible to a change in quality with time. If it exceeds 50%, the film formation rate is decreased due to a decease in flow rate of Ar. In addition, the interior of the chamber becomes very dirty because of carbides and the like. This causes reduction in productivity.

EXAMPLE 1

Examples will be described below. In the examples, data recording medium according to the embodiment are actually manufactured, and their characteristics are evaluated.

A pre-grooved polycarbonate substrate having a diameter of 130 mm, a thickness of 1.2 mm, and a track pitch of 1.6 μm was placed in a polymerizing vessel of a plasma polymerizing apparatus. C$_4$F$_8$ was used as a source gas. A 1,000-Å thick undercoat layer was formed on the substrate by performing plasma polymerization with respect to the substrate under the following conditions: the pressure of the C$_4$F$_8$ gas: 0.05 Torr; the flow rate of the C$_4$F$_8$ gas: 160 cc/min per 1 m$^3$; and an electrode current density: about 1.0 mA/cm$^2$. Subsequently, the substrate, on which the undercoat layer was formed, was placed in a reaction vessel of a reactive sputtering apparatus. A 300-Å thick recording layer was formed on the undercoat layer by performing reactive sputtering with respect to the substrate having the undercoat layer by using a target composed of an alloy having a composition of Ag$_{33}$Te$_{67}$ under the following conditions: the ratio of the flow rate of a CH$_4$ gas to the total flow rate of a gas mixture of an Ar gas and a CH$_4$ gas; 40%; the pressure of the gas mixture: 5×10-3 Torr; and an electric power density to be applied to the target: 1 W/cm$^2$. With this process, a data recording medium was obtained.

In order to record data in the obtained data recording medium, the medium was rotated at 1,800 rpm. A laser beam generated from a diode laser having a laser wavelength of 0.83 μm was focused by a lens having a numerical aperture of 0.55. Data recording was performed by irradiating the focused laser beam onto the data recording medium from a side opposite to the recording layer.

Data reproducing operation of the data recording medium in which the data was recorded, was performed, and the carrier-to-noise ratios of recorded/reproduced signals were measured.

Figure 16:
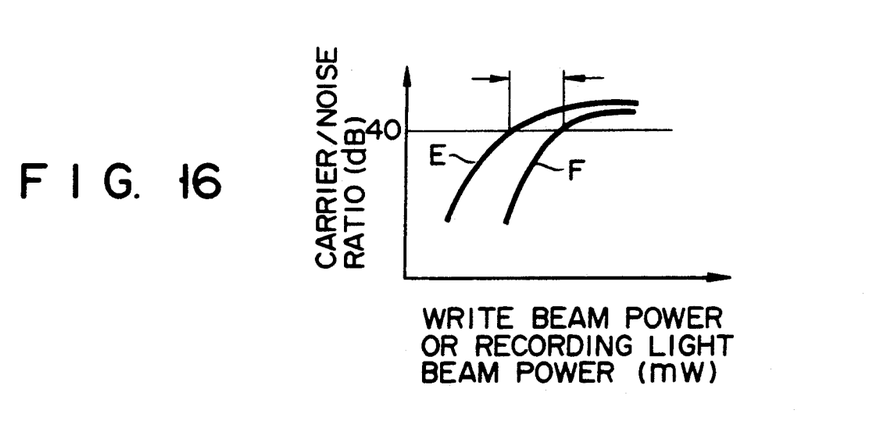
FIG. 16 is a graph showing a relationship which a data recording medium of the present invention obtained by using an Ag-Te alloy has, between the carrier-to-noise ratio of a recorded/reproduced signal and a recording light beam power, in comparison with that of the conventional data recording medium.

FIG. 16 shows a relationship which the data recording medium of the present invention has, between the carrier-to-noise ratio of a recorded/reproduced signal and a recording light beam power, in comparison with that of the conventional data recording medium. Referring to FIG. 16, a characteristic curve E represents the characteristics of the data recording medium of the present invention, and a characteristic curve F represents the characteristics of a conventional data recording medium. Since it is generally confirmed that pit formation is properly performed if the carrier-to-noise ratio of a recorded/reproduced signal is 40 dB, the energy threshold level of a recording light beam at the time when the carrier-to-noise ratio of a recorded/reproduced signal reached 40 dB, were evaluated. As shown in FIG. 16, the recording light beam power of the data recording medium of the present invention at the time when the carrier-to-noise ratio of the recorded/reproduced signal reached at 40 dB, was smaller than that of the conventional data recording medium by 1.5 mW. Consequently, the recording sensitivity of the recording medium of the present invention was superior to that of the conventional recording medium.

Figure 17:
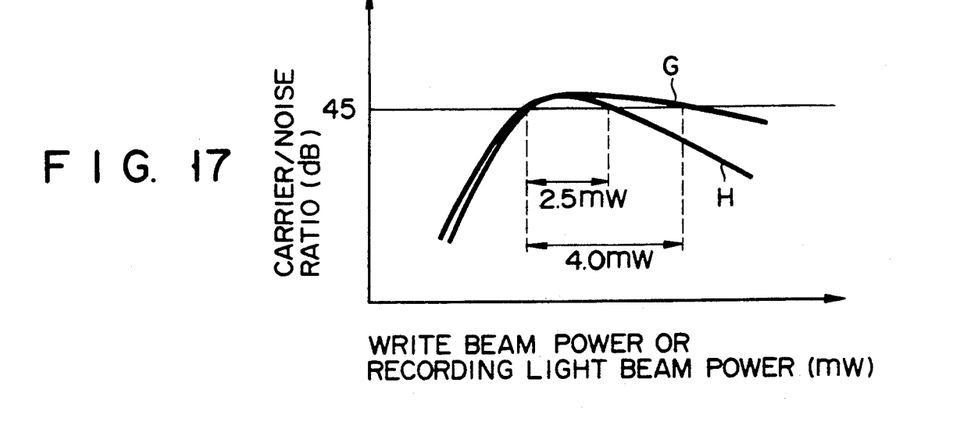
FIG. 17 is a graph showing a relationship which a data recording medium of the present invention obtained by using an Ag-Te alloy has, between the carrier-to-noise ratio of a recorded/reproduced signal and a recording light beam power, in comparison with that of a data recording medium which has the overcoat layer, of the present invention obtained by using an Ag-Te alloy.

FIG. 17 shows a relationship which the data recording medium of the present invention has, between the carrier-to-noise ratio of a recorded/reproduced signal and a recording light beam power, in comparison with that of a data recording medium of the present invention which has the overcoat layer.

Referring to FIG. 17, curve H represents the characteristics of the data recording medium of the present invention having no overcoat layer, and curve G represents the characteristics of the data recording medium of the present invention having the overcoat layer. As shown in FIG. 17, in the data recording medium having the overcoat layer, the width of a recording light beam power with which a carrier-to-noise ratio of 45 dB or more was obtained, was about 4.0 mW, which was larger than that in the data recording medium having no overcoat layer by 2.5 mW.

EXAMPLE 2

A data recording medium was obtained following the same procedures as in Example 1 except that a target composed of an alloy having a composition of $Au_{12}$-$Te_{88}$ was used when a recording layer was formed by reactive sputtering.

Figure 18:
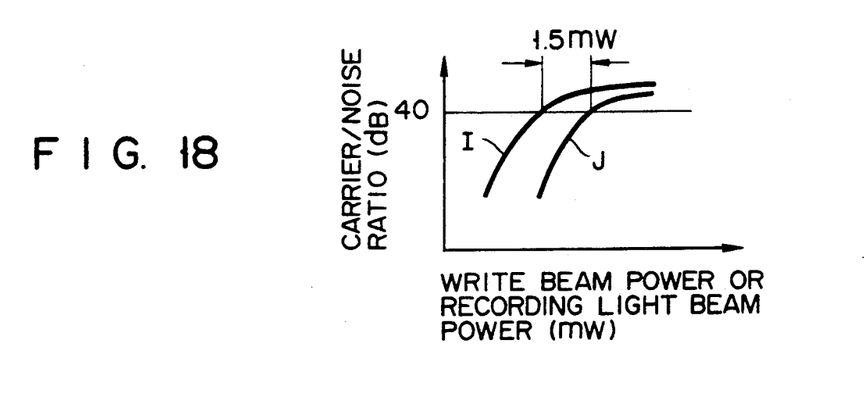
FIG. 18 is a graph showing a relationship which a data recording medium of the present invention obtained by using an Au-Te alloy has, between the carrier-to-noise ratio of a recorded/reproduced signal and a recording light beam power, in comparison with that of the conventional data recording medium.
Figure 19:
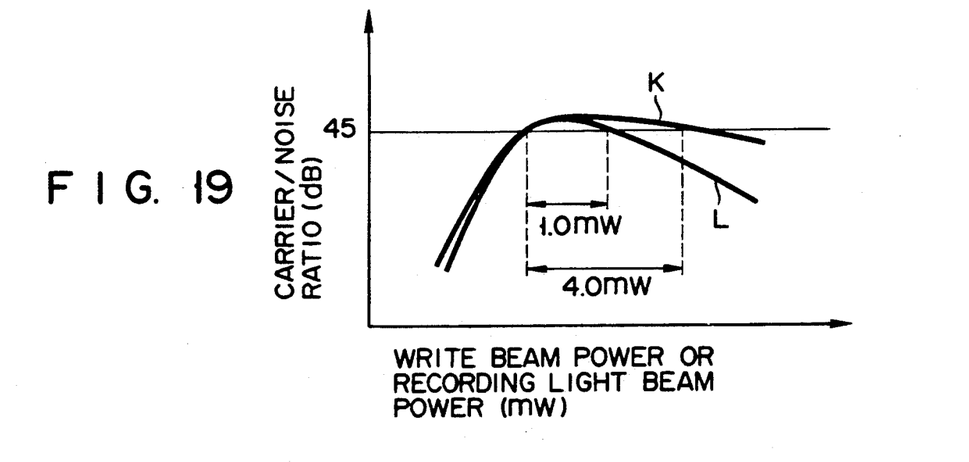
FIG. 19 is a graph showing a relationship which a data recording medium of the present invention obtained by using an Au-Te alloy has, between the carrier-to-noise ratio of a recorded/reproduced signal and a recording light beam power, in comparison with that of a data recording medium which has the overcoat layer of the present invention obtained by using an Au-Te alloy.

Relationships between the carrier-to-noise ratios of recorded/reproduced signals and recording light beam power were measured following the same procedures as in Example 1. FIGS. 18 and 19 show the results, respectively.

As in apparent from FIG. 18, the recording light beam power of the data recording medium of the present invention (a characteristic curve I) at the time when the carrier-to-noise ratio of recorded/reproduced signal reaches 40 dB, was smaller than that of the conventional data recording medium (a characteristic curve J) by 1.5 mW. consequently, the recording sensitivity of the recording medium of the present invention was superior to that of the conventional recording medium.

In addition, as is apparent from FIG. 19, in the data recording medium of the present invention having the overcoat layer (a characteristic curve K), the width of a recording light beam power with which a carrier-to-noise ratio of 45 dB or more were obtained, was about 4.0 mW, which was larger than that in the data recording medium having no overcoat layer of the present invention, (a characteristic curve L), by 3.0 mw.

EXAMPLE 3

A data recording medium was obtained following the same procedures as in Example 1 except that a target composed of an alloy having a composition of $Cu_{30}$-$Te_{70}$ was used when a recording layer was formed by reactive sputtering.

Figure 20:
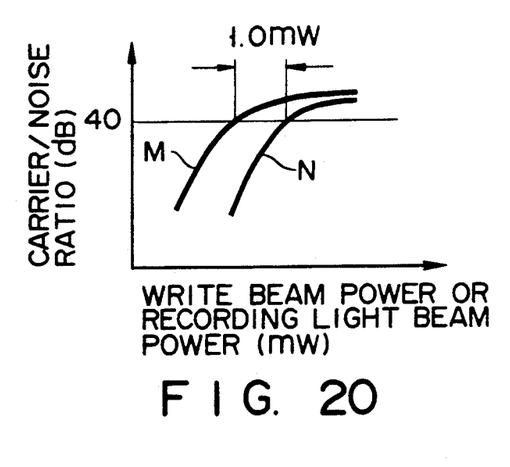
FIG. 20 is a graph showing a relationship which a data recording medium of the present invention obtained by using a Cu-Te alloy has, between the carrier-to-noise ratio of a recorded/reproduced signal and a recording light beam power, in comparison with that of the conventional data recording medium.
Figure 21:
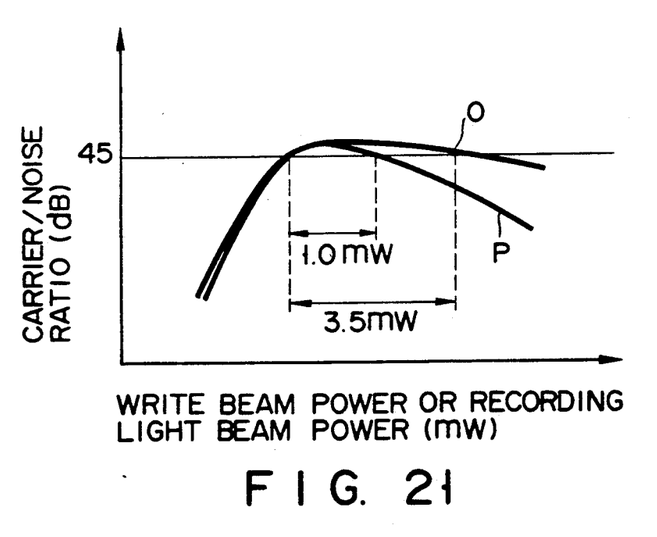
FIG. 21 is a graph showing a relationship which a data recording medium of the present invention obtained by using a Cu-Te alloy has, between the carrier-to-noise ratio of a recorded/reproduced signal and a recording light beam power, in comparison with that of a data recording medium which has the overcoat layer of the present invention obtained by using a Cu-Te alloy.

Relationships between the carrier-to-noise ratios of recorded/reproduced signals and recording light beam power were measured following the same procedures and in Example 1. FIGS. 20 and 21 show the results, respectively.

As is apparent from FIG. 20, the recording light beam power of the data recording medium of the present invention (a characteristic curve M) at the time when the carrier-to-noise ratio of the recorded/reproduced signal reaches 40 dB was smaller than that of the conventional data recording medium (a characteristic curve N) by 1.0 mW. Consequently, the recording sensitivity of the recording medium of the present invention was superior to that of the conventional recording medium.

In addition, as is apparent from FIG. 21, in the data recording medium of the present invention having the overcoat layer (a characteristic curve O), the width of a recording light beam power with which a carrier-to-noise ratio of 45 dB or more was obtained, was about 3.5 mW, which was larger than that in the data recording medium of the present invention having no overcoat layer (a characteristic curve P) by 2.5 mW.

According to the data recording medium of the present invention, a recording layer formed on an undercoat layer contains a metal selected from the group consisting of Ag, Au, and Cu, Te, C, and H. If the recording layer contains Ag, the content ratio x of Ag to Te satisfies $2 \leq x \leq 55$ at. % in $Ag_xTe_{100-x}$. If the recording layer contains Au, the content ratio y of Au to Te satisfies $2 \leq y \leq 43$ at. % in $Au_yTe_{100-y}$. If the recording layer contains Cu, the content ratio z of Cu to Te satisfies $2 \leq z \leq 40$ at. % in $Cu_zTe_{100-z}$. The Ag-Te, Au-Te, and Cu-Te alloys having content ratios which fall within the above-described ranges have low melting points. Therefore, the sensitivity of recording by means of light beams is improved. Hence, even if the energy threshold of a light beam required for the formation of pits for data recording is lowered, data can be properly recorded.

According to the method of manufacturing the data recording medium of the present invention, a pit formation type recording layer containing a metal selected from the group consisting of Ag, Au, and Cu and Te is formed by reactive sputtering in the presence of a gas mixture of an Ar gas and a hydrocarbon gas under the condition that the ratio of the flow rate of the hydrocarbon gas to the total flow rate of the gas mixture is 5 to 50%. with this process, a recording layer exhibiting stable recording sensitivity can be easily obtained. An undercoat layer is formed under the following conditions: the pressure of a fluorocarbon gas: 0.01 to 0.1 Torr; the flow rate of the fluorocarbon gas: 20 to 400 cc/min per 1 m$^3$; and an electrode current density: 0.5 to 2.0 mA/cm$^2$. With this process, the film formation rate of the undercoat layer can be increased.

In addition, according to the data recording medium of the present invention, the thickness of an undercoat layer is set to be 600 to 1,000 Å so that light which is irradiated on the data recording medium in order to read data, exhibits a multiple interference effect within this range of thickness. This increases the reflectivity of the data recording medium. Therefore, the data recording medium allows reproduction of data with light which is not much influenced by noise in a data read operation, and the data can be stably read. In addition, data can be recorded even if the energy threshold of light beam is small.

As has been described above, according to the present invention, a data recording medium having excellent recording sensitivity can be easily manufactured.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording medium comprising:
    a substrate;
    an undercoat layer formed on said substrate by plasma polymerization using a source gas containing $C_4F_8$; and a recording layer formed on said undercoat layer containing Te, C, H and a metal selected from the group consisting of Ag, Au, and Cu, the content ratio x of Ag to Te satisfying $2 \leq x \leq 55$ at. % in $Ag_xTe_{100-x}$, a content ratio y of Au to Te satisfying $2 \leq y \leq 43$ at. % in $Au_yTe_{100-y}$, a content ratio z of Cu to Te satisfying $2 \leq z \leq 40$ at. % in $Cu_zTe_{100-z}$, and data being recorded in said recording layer by forming pits therein.

2. A medium according to claim 1, wherein said undercoat layer has a thickness of 600 to 1600 Å.

3. A medium according to claim 1, further comprising an overcoat layer formed on said recording layer.

4. A medium according to claim 3, wherein said overcoat layer has a thickness of 50 to 150 Å.

5. A medium according to claim 1, wherein $C_4F_8$ is octafluorocyclobutane.

6. A medium as claimed in claim 1, wherein the recording layer contains Te, C, H and Ag.

7. A medium as claimed in claim 1, wherein the recording layer contains Te, C, H and Au.

8. A medium as claimed in claim 1, wherein the recording layer contains Te, C, H and Cu.

9. A data recording medium comprising:
a substrate;
an undercoat layer formed on said substrate by plasma polymerization using a source gas containing fluorocarbon and having a thickness of 600 to 1600 Å; and
a recording layer which is formed on said undercoat layer containing Te, C, H and a metal selected from the group consisting of Ag, Au, and Cu, data being recorded in said recording layer by forming pits therein.

* * * * *